(12) United States Patent
Sato

(10) Patent No.: US 6,421,207 B1
(45) Date of Patent: Jul. 16, 2002

(54) CONTACT TYPE MAGNETIC DISK DRIVE

(75) Inventor: Akinobu Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 712 days.

(21) Appl. No.: 08/772,068

(22) Filed: Dec. 19, 1996

(30) Foreign Application Priority Data

Dec. 28, 1995 (JP) .............................................. 7-342149

(51) Int. Cl.[7] .............................. G11B 5/48; G11B 21/16
(52) U.S. Cl. .................................. 360/246.4; 360/237.1
(58) Field of Search ................................ 360/103, 104, 360/237.1, 244.2, 245, 245.3, 245.4, 245.5, 246.1, 246.2, 246.4

(56) References Cited

U.S. PATENT DOCUMENTS

| | | | |
|---|---|---|---|
| 5,243,482 A | * 9/1993 | Yamaguchi et al. | 360/104 |
| 5,327,310 A | * 7/1994 | Bischoff et al. | 360/103 |
| 5,408,373 A | * 4/1995 | Bajorek et al. | 360/104 |
| 5,453,315 A | * 9/1995 | Hamilton et al. | 428/109 |
| 5,454,158 A | * 10/1995 | Fontana, Jr. et al. | 360/104 X |
| 5,483,025 A | * 1/1996 | Hamilton et al. | 360/104 X |
| 5,486,967 A | * 1/1996 | Tanaka et al. | 360/113 |
| 5,490,027 A | * 2/1996 | Hamilton et al. | 360/104 |
| 5,504,639 A | * 4/1996 | Kawazoe | 360/103 |
| 5,530,605 A | * 6/1996 | Hamaguchi et al. | 360/104 |
| 5,550,691 A | * 8/1996 | Hamilton | 360/103 |
| 5,557,488 A | * 9/1996 | Hamilton et al. | 360/104 |
| 5,560,097 A | * 10/1996 | Bajhorek et al. | 360/104 X |
| 5,561,570 A | * 10/1996 | Gill et al. | 360/104 |
| 5,644,450 A | * 7/1997 | Handa | 360/104 |
| 5,673,161 A | * 9/1997 | Yanagisawa et al. | 360/103 |

FOREIGN PATENT DOCUMENTS

JP  5-508808  7/1993

OTHER PUBLICATIONS

"Contact Recording on Perpendicular Rigid Media," Journal of Magnetic Society of Japan, vol. 15, Supplement No. S2 (1991), pp. 483–490.

* cited by examiner

Primary Examiner—William Klimowicz
(74) Attorney, Agent, or Firm—Michael Best & Friedrich LLC; Laff, Whitesel & Saret, Ltd.; J. Warren Whitesel

(57) ABSTRACT

In a contact type magnetic disk drive, a suspension spring or a load beam spring has a length smaller than 5 mm inclusive. This successfully reduces the amplitude of vibration to occur during seek. Also, a magnetic head slider has a mass of greater than 2 mg inclusive and is urged against the disk medium by a load of less than 1 g inclusive, so that a mean wear thickness and maximum amount of jump are reduced. For the reduction of the mean wear thickness and maximum amount of jump, the disk medium may include a lubrication layer having a thickness of greater than 5 nm inclusive, or the suspension spring or the load beam spring may have its thickness sequentially reduced from the side adjoining the spring support mechanism toward the slider. The disk drive reduces the wear of the slider and that of a magnetic disk, and achieves durability and reliability as well as high-density recording.

4 Claims, 4 Drawing Sheets

CONTACT TYPE MAGNETIC DISK DRIVE

BACKGROUND OF THE INVENTION

The present invention relates to a contact type magnetic disk drive and, more particularly, to a contact type magnetic disk drive including a magnetic head capable recording or reproducing data in sliding contact with a magnetic disk or medium.

Recently, high-density recording has been steadily enhanced in the data memory file art. One of the keys to high-density recording is the reduction of the gap between a magnetic head or electromagnetic transducer for writing and reading data and a magnetic disk or medium storing data. To reduce the gap, a contact type magnetic disk drive capable of recording or reproducing data in or out of a disk with its magnetic head sliding on the disk has been proposed in, e.g., H. Hamilton "CONTACT RECORDING ON PERPENDICULAR RIGID MEDIA", Journal of Magnetic Society of Japan, Vol. 15, Supplement No. S2(1991), pp. 483–490 and Japanese Patent Laid-Open Publication No. 5-508808.

The contact type disk drive has the head mounted on a magnetic head slider. A suspension spring is used to fix the slider in place and to urge it against a disk. In this type of disk drive, the slider is urged against the disk by a load of 10 mg to 500 mg which is one figure to two figures smaller than a load of 2 g to 10 g particular to a conventional magnetic disk drive with a flying slider, so that the wear of the head and disk is reduced. To implement such a small load, the suspension spring is provided with a length great enough to reduce its force at the free end. Usually, the suspension spring has a length of 5 mm or above.

In the contact type disk drive, the wear of the head and disk cannot be reduced unless the spring constant of the suspension spring is reduced to reduce the intensity of shock to occur when the head and disk contact. However, reducing the spring constant brings about a problem that servo data read errors ascribable to the resulting low seek rigidity obstruct high-density recording. Specifically, in the event of the seek of the slider, a frictional force acts in the seek direction and causes the slider to vibrate in the seek direction. The vibration causes read errors to occur in a servo signal, preventing high track density from being achieved.

The vibration of the slider in the seek direction will be effectively reduced if the rigidity of the suspension spring or that of a load beam spring in the seek direction is increased. That is, an increase in seek rigidity shifts the resonance frequency to the higher frequency side and thereby reduces the amplitude of vibration. However, an increase in seek rigidity directly translates into an increase in spring constant which, in turn, leads to an increase in load. This would aggravate the wear of the head and disk. The above contradictory conditions prevent the improvement of seek rigidity and the reduction of wear from being achieved at the same time.

SUMMARY OF THE INVENTION

It is therefore an object of the present invention to provide a contact type magnetic disk drive implementing high-density recording and high reliability.

In accordance with the present invention, a contact type magnetic disk drive includes a contact pad carrying an electromagnetic transducer for recording and reproduction on an end thereof, and capable of sliding in contact with a magnetic disk medium. The contact pad is mounted on a magnetic head slider. A suspension spring supports the magnetic head slider. A spring support mechanism supports the suspension spring. The suspension spring has a length smaller than 5 mm inclusive.

Also, in accordance with the present invention, a contact type magnetic disk drive includes a contact pad carrying an electromagnetic transducer for recording and reproduction on an end thereof, and capable of sliding in contact with a magnetic disk medium. The contact pad is mounted on a magnetic head slider. A gimbal spring supports the magnetic head slider. A load beam spring supports the gimbal spring. A spring support mechanism supports the load beam spring. The load beam spring has a length smaller than 5 mm inclusive.

BRIEF DESCRIPTION OF THE DRAWINGS

The above and other objects, features and advantages of the present invention will become apparent from the following detailed description taken with the accompanying drawings in which.

In the figures, identical reference numerals denote identical structural elements.

DESCRIPTION OF THE PREFERRED EMBODIMENTS

Figure 1:
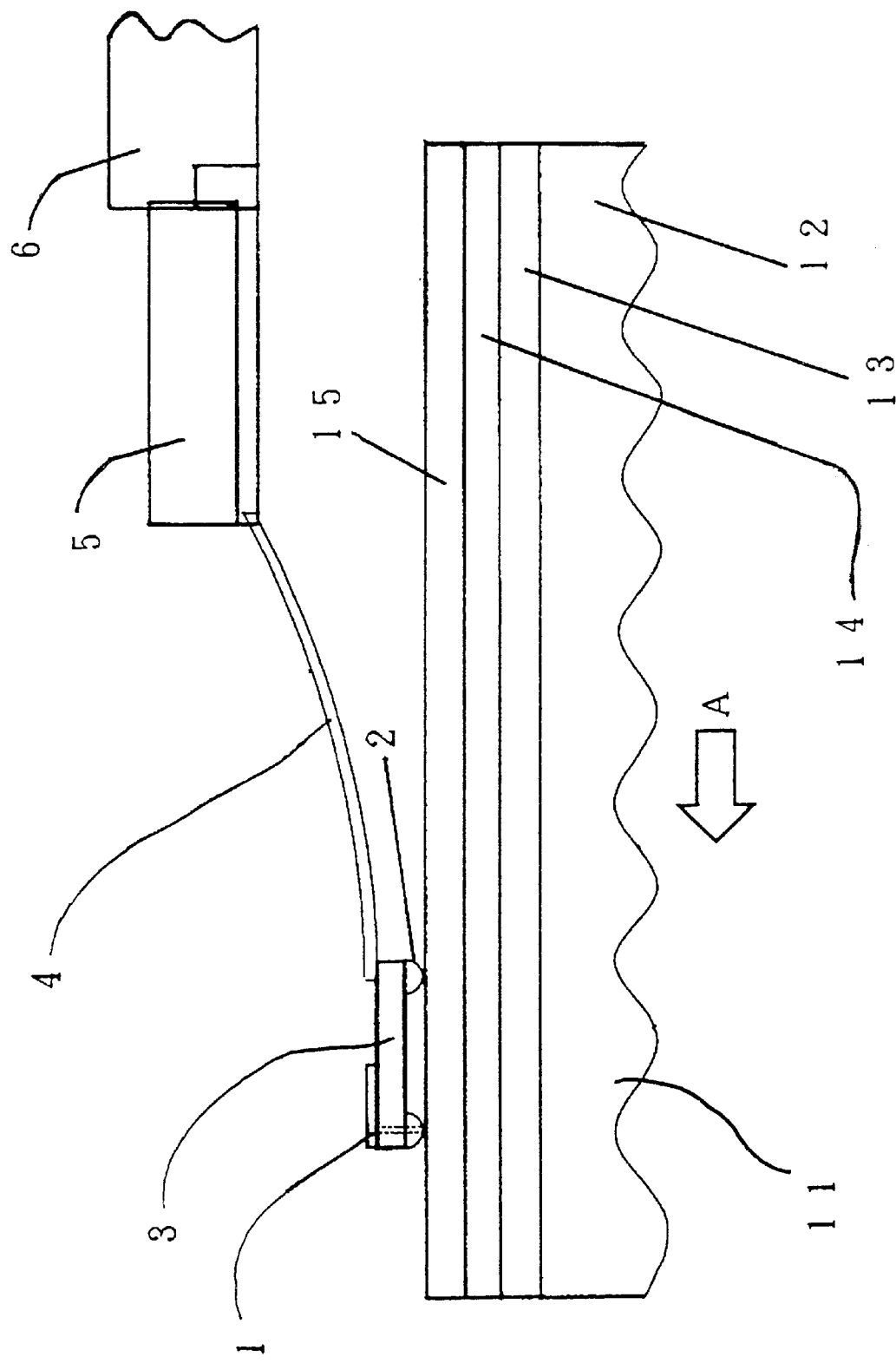
FIG. 1 is a side elevation showing a contact type magnetic disk embodying the present invention.

Referring to FIG. 1 of the drawings, a contact type magnetic disk drive embodying the present invention is shown. As shown, the disk drive includes a magnetic head or recording/reproducing device 1 for recording and reproducing data from a magnetic disk or medium 11. A contact pad 2 is formed on the end of the head 1. The head 1 and contact pad 2 are mounted on a magnetic head slider 3 which is supported by a suspension spring 4. A spring support mechanism 5 supports the suspension spring 4. The reference numeral 6 designates a seek mechanism.

Figure 2:
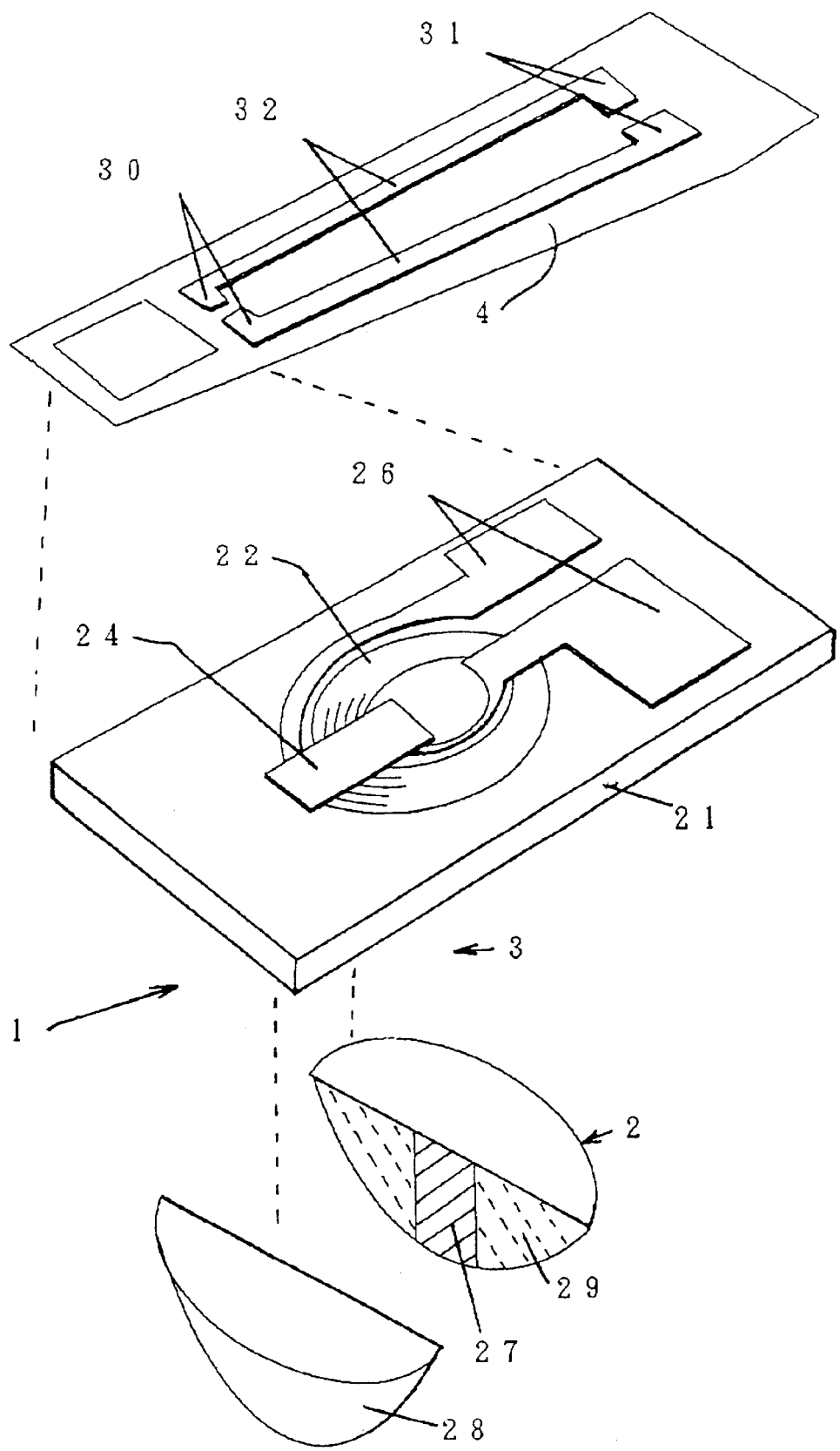
FIG. 2 is an exploded perspective view of a magnetic head slider included in the embodiment.
Figure 3:
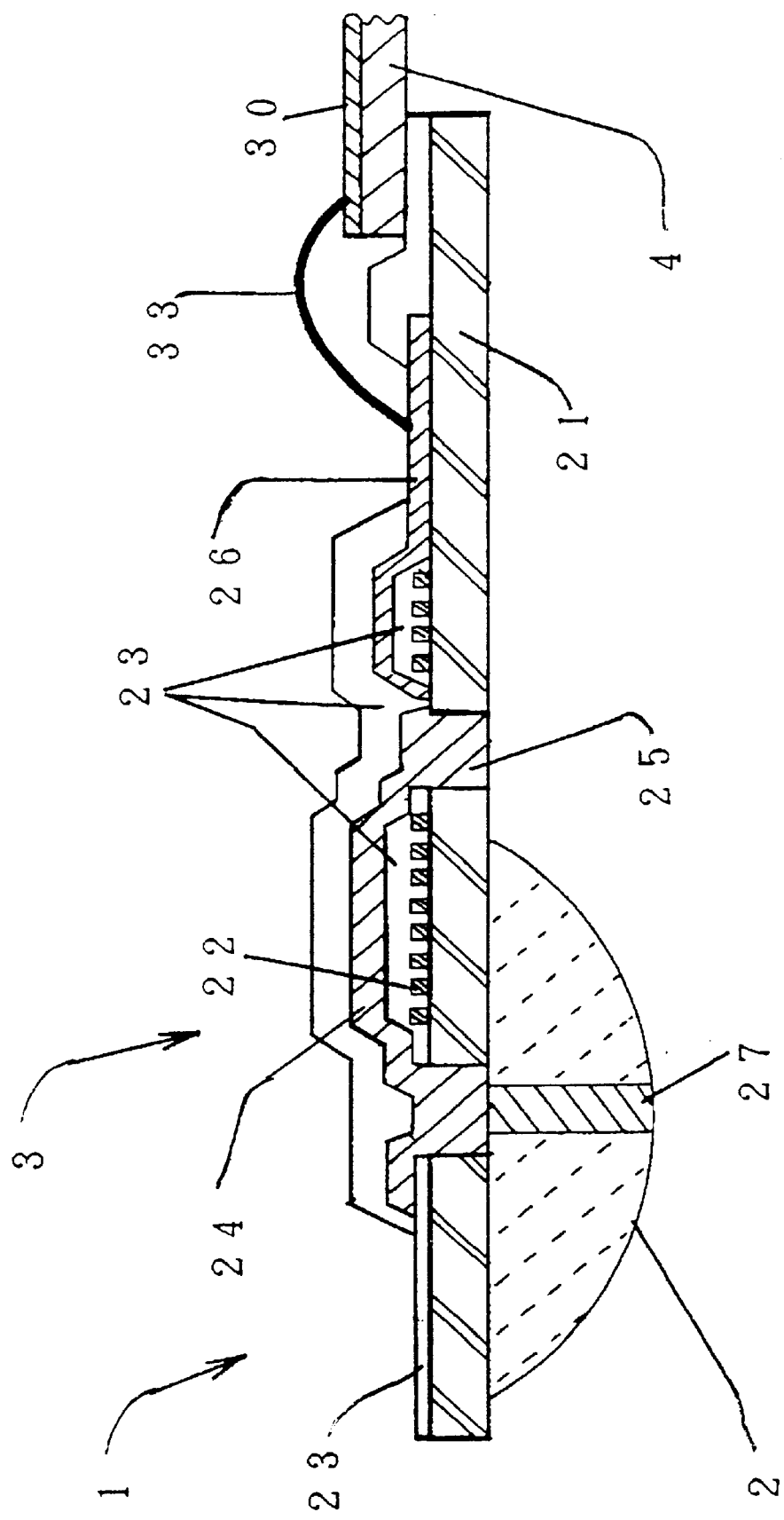
FIG. 3 is a section of the magnetic head slider.

FIGS. 2 and 3 show the magnetic head slider 3 and suspension spring 4 in detail. As shown, the slider 3 has a substrate 21 implemented by diamond and formed with an opening at its center. A coil 22 is formed on the susbstrate 21 and implemented as a thin Cu film. An insulating film 23 covers the surface of the coil 22. A yoke 25 is formed on the insulating film 23 and formed of Fe—Ni alloy. The yoke 25 is connected to a return yoke 25 also formed of Fe—Ni alloy, forming a magnetic circuit for a magnetic flux. The coil 22 has its opposite ends connected to electrodes 26.

The yoke 27 extends throughout the center of the contact pad 2. The contact pad 2 is made up of a contact pad 28 formed by machining diamond, and a contact pad 29 with the yoke 27 buried in its center. After the two contact pads 28 and 29 have been joined together, they are polished to form a hemispherical or convex surface whose mean center line roughness R is about 0.5 nm. The thickness of the substrate 21 may be varied in order to control the total mass of the slider 3. The slider 3 is adhered or otherwise affixed to the suspension spring 4. A pair of wirings 32 are formed on the suspension spring 4 and implemented as thin Cu films. Each wiring 32 has electrodes 30 and 31 at both ends thereof. The slider 3 is connected to the electrodes 30 of the wirings 32 by Au wires 33. The suspension spring 4 is formed of elastic stainless steel.

As shown in FIG. 1, the disk 11 includes a glass substrate, not shown, on which a Cr underlayer 12 is formed. A magnetic recording support 13 is formed on the underlayer 12 and implemented as a 30 nm thick CoCrPt film formed by sputtering. A protection layer 14 is formed on the support 13 by the sputtering of diamond-like carbon and implemented as a 5 nm thick film. Further, a lubrication layer 15 is formed on the protection layer 14 by dipping and implemented as a 5 nm thick perfluoropolyether. A dipping solution may have its density controlled in order to vary the thickness of the lubrication layer 15. The disk 11 runs in the direction indicated by an arrow A in FIG. 1.

Figure 4:
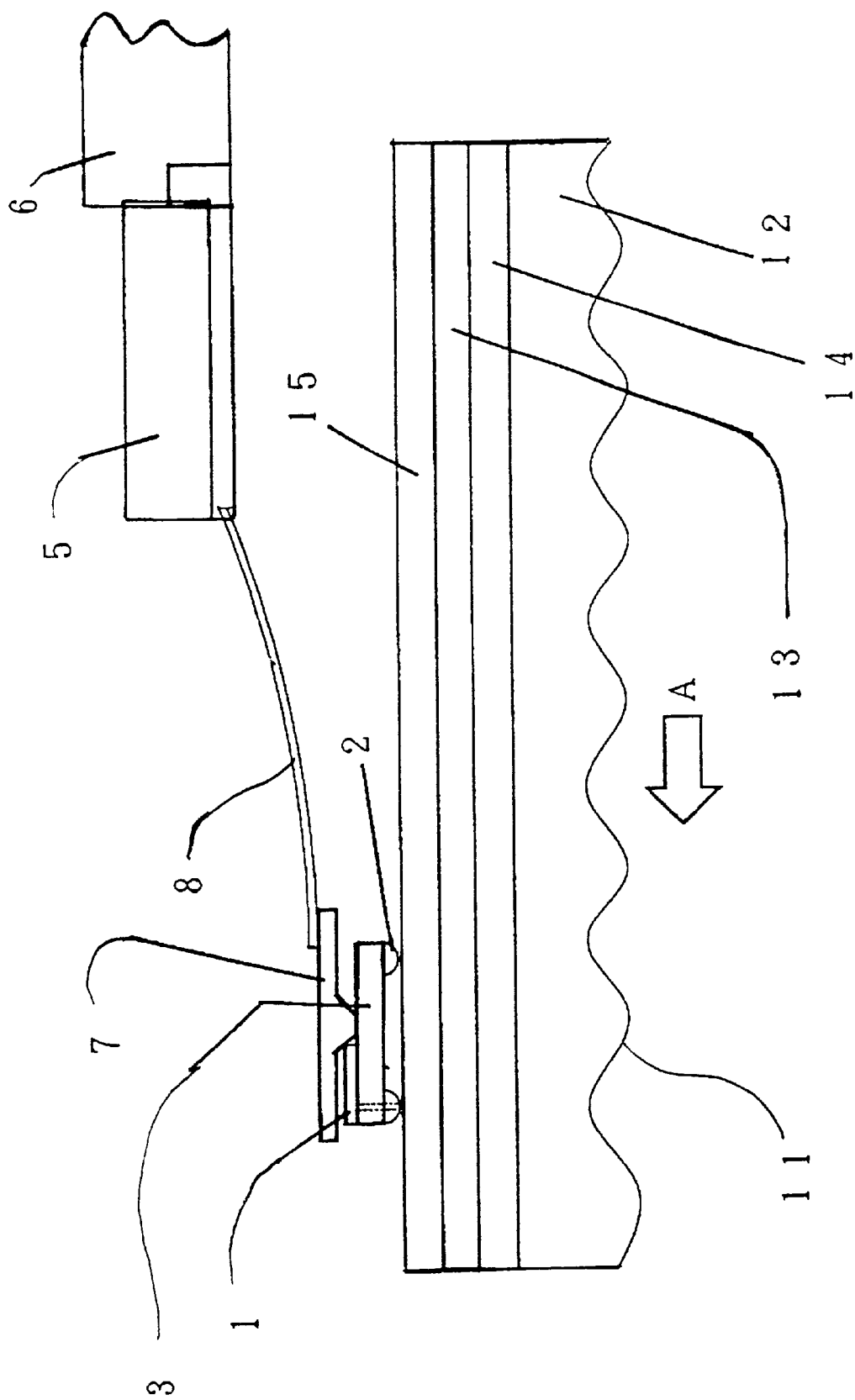
FIG. 4 is a side elevation showing an alternative embodiment of the present invention.

FIG. 4 shows an alternative embodiment of the present invention. As shown, the head 1 and slider 3 each has the same configuration as in the embodiment shown in FIG. 1. The difference is that the suspension spring 4 o f FIG. 1 is replaced with a gimbal spring 7 and a load beam spring 8. The gimbal spring 7 is connected to the slider 3. The load beam spring 8 is connected to the gimbal spring 7 and spring support mechanism 5.

It should be noted that the underlayer 12, support 13, protection layer 14 and lubrication layer 15 constituting the disk 11 may each be formed of any suitable material and by any suitable method other than the specific material and method described above.

Examples 1–21 of the illustrative embodiments will be described which are different from each other as to the configurations of the suspension spring 4 and load beam spring 8, the mass of the slider 3, the load urging the slider 3 against the disk 11, and the thickness of the lubrication layer 15. Comparative Examples 1–9 will also be described for comparison.

EXAMPLE 1

The suspension spring 4 was 1 mm long, 0.015 mm thick, and 0.5 mm wide. The slider 3 had a mass of 2.0 mg. The slider 3 was urged against the disk 11 by a load of 100 mg. The lubrication layer 15 was 5 nm thick.

EXAMPLE 2

The suspension spring 4 was 2 mm long, 0.020 mm thick, and 0.5 mm wide. The suspension spring 4 had the same configuration as in Example 1.

EXAMPLE 3

The suspension spring 4 was 3 mm long, 0.025 mm thick, and 0.5 mm wide. The suspension spring 4 had the same configuration as in Example 1.

EXAMPLE 4

The suspension spring 4 was 5 mm long, 0.030 mm thick, and 0.5 mm wide. The suspension spring 4 had the same configuration as in Example 1.

Comparative Example 1

The suspension spring 4 was 7 mm long, 0.030 mm thick, and 0.5 mm wide. The suspension spring 4 had the same configuration as in Example 1.

Comparative Example 2

The suspension spring 4 was 10 mm long, 0.030 mm thick, and 0.5 mm wide. The suspension spring 4 had the same configuration as in Example 1.

EXAMPLE 5

The suspension spring 4 was 5 mm long, 0.030 mm thick, and 0.5 mm wide. The slider 3 had a mass of 10.0 mg. The slider 3 was urged against the disk 11 by a load of 100 mg. The lubrication layer 15 was 5 nm thick.

EXAMPLE 6

Example 6 is identical with Example 5 except that the slider 3 had a mass of 4.0 mg.

Comparative Example 3

Comparative Example 3 is identical with Example 5 except that the slider 3 had a mass of 1.0 mg.

Comparative Example 4

Comparative Example 3 is identical with Example 5 except that the slider 3 had a mass of 0.5 mg.

Comparative Example 5

Comparative Example 5 is identical with Example 5 except that the slider 3 had a mass of 0.1 mg.

EXAMPLE 7

The suspension spring 4 was 5 mm long, 0.030 mm thick, and 0.5 mm wide. The slider 3 had a mass of 2.0 mg. The slider 3 was urged against the disk 11 by a load of 1 mg. The lubrication layer 15 was 5 nm thick.

EXAMPLE 8

Example 8 is identical with Example 7 except that the slider 3 was urged against the disk 11 by a load of 10 mg.

EXAMPLE 9

Example 9 is identical with Example 7 except that the slider 3 was urged against the disk 11 by a load of 500 mg.

EXAMPLE 10

Example 9 is identical with Example 7 except that the slider 3 was urged against the disk 11 by a load of 500 mg.

Comparative Example 6

Comparative Example 6 is identical with Example 7 except that the slider 3 was urged against the disk 11 by a load of 2,000 mg.

Comparative Example 7

Comparative Example 7 is identical with Example 7 except that the slider 3 was urged against the disk 11 by a load of 5,000 mg.

EXAMPLE 11

The suspension spring 4 was 5 mm long, 0.030 mm thick, and 0.5 mm wide. The slider 3 had a mass of 2.0 mg. The slider 3 was urged against the disk 11 by a load of 100 mg. The lubrication layer 15 was 1 nm thick.

EXAMPLE 12

Example 12 is identical with Example 11 except that the lubrication layer 15 was 3 nm thick.

EXAMPLE 13

Example 13 is identical with Example 11 except lubrication layer 15 was 7 nm thick.

EXAMPLE 14

Example 14 is identical with Example 11 except that the lubrication layer 15 was 10 nm thick.

EXAMPLE 15

Example 15 is identical with Example 11 except that the lubrication layer 15 was 20 nm thick.

EXAMPLE 16

The load beam spring 8 was 1 mm long, 0.015 mm thick, and 0.5 mm wide. The slider 3 had a mass of 2.0 mg. The slider 3 was urged against the disk 11 by a load of 100 mg. The lubrication layer 15 was 5 nm thick.

EXAMPLE 17

Example 17 is identical with Example 16 except that the load beam spring 8 was 2 mm long, 0.20 mm thick, and 0.5 mm wide.

EXAMPLE 18

Example 18 is identical with Example 16 except that the load beam spring 8 was 3 mm long, 0.025 mm thick, and 0.5 mm wide.

EXAMPLE 19

Example 19 is identical with Example 16 except that the load beam spring 8 was 3 mm long, 0.030 mm thick, and 0.5 mm wide.

Comparative Example 8

Comparative Example 8 is identical with Example 16 except that the load beam spring 8 was 7 mm long, 0.030 mm thick, and 0.5 mm wide.

Comparative Example 9

Comparative Example 9 is identical with Example 16 except that the load beam spring 8 was 10 mm long, 0.030 mm thick, and 0.5 mm wide.

EXAMPLE 20

The suspension spring 4 was 3 mm long, 0.5 mm wide, and 0.050 mm thick at its portion associated with the spring support mechanism 5 and 0.010 mm thick at its portion associated with the slider 3. That is, the thickness of the spring 4 was sequentially reduced toward the slider 3. The slider 3 had a mass of 2.0 mg. The slider 3 was urged against the disk 11 by a load of 100 mg. The lubrication layer 15 was 5 nm thick.

EXAMPLE 21

The load beam spring 8 was 3 mm long, 0.5 mm wide, and 0.050 mm thick at its portion associated with the spring support mechanism 5 and 0.010 mm thick at its portion associated with the slider 3. That is, the thickness of the spring 8 was sequentially reduced toward the slider 3. The slider 3 had a mass of 2.0 mg. The slider 3 was urged against the disk 11 by a load of 100 mg. The lubrication layer 15 was 5 nm thick.

The magnetic heads having the above configurations were subjected to wear tests. During the tests, the disks 11 were caused to spin at a rate of 5,400 rpm. Further, on the elapse of 2,000 hours since the wear tests, there were determined the mean wear thicknesses of the surfaces of the disks 11 and the maximum amounts of jump of the sliders 3 occurred during seek. Specifically, each slider 3 does not constantly contact the associated disk 11 during test, but jumps due to vibration in the seek direction. The above words "maximum amounts of jump" should be understood in this sense. For the measurement of the amount of jump, use was made of a laser Doppler vibration (LDV) system. A laser beam was issued to the rear of each slider 3, and the frequency variation of the resulting reflection was measured in order to determine a speed. Further, the determined speed was integrated to produce a displacement.

The results of wear tests conducted with Examples 1–21 and Comparative Examples 1–9 are listed in Tables 1 and 2 below.

TABLE 1

| | Kind of Spring | Configuration of Spring | | | Mass of Slider (mg) | Load (mg) | Thickness of Lubricant (nm) | Max Amount of Jump (nm) | Wear Thickness (nm) |
|---|---|---|---|---|---|---|---|---|---|
| | | Length (mm) | Thickness (mm) | Width (mm) | | | | | |
| Ex. 1 | S | 1 | 0.015 | 0.5 | 2.0 | 100 | 5 | 2.2 | 0.031 |
| Ex. 2 | S | 2 | 0.020 | 0.5 | 2.0 | 100 | 5 | 2.0 | 0.025 |
| Ex. 3 | S | 3 | 0.025 | 0.5 | 2.0 | 100 | 5 | 2.1 | 0.030 |
| Ex. 4 | S | 5 | 0.030 | 0.5 | 2.0 | 100 | 5 | 2.5 | 0.032 |
| Com. Ex. 1 | S | 7 | 0.030 | 0.5 | 2.0 | 100 | 5 | 13.8 | 0.062 |
| Com. Ex. 2 | S | 10 | 0.030 | 0.5 | 2.0 | 100 | 5 | 21.5 | 0.083 |
| Ex. 5 | S | 5 | 0.030 | 0.5 | 10.0 | 100 | 5 | 1.8 | 0.030 |
| Ex. 6 | S | 5 | 0.030 | 0.5 | 4.0 | 100 | 5 | 2.2 | 0.032 |
| Com. Ex. 3 | S | 5 | 0.030 | 0.5 | 1.0 | 100 | 5 | 16.3 | 0.023 |
| Com. Ex. 4 | S | 5 | 0.030 | 0.5 | 0.5 | 100 | 5 | 18.6 | 0.025 |
| Com. Ex. 5 | S | 5 | 0.030 | 0.5 | 0.1 | 100 | 5 | 29.8 | 0.020 |
| Ex. 7 | S | 5 | 0.030 | 0.5 | 2.0 | 1 | 5 | 3.2 | 0.009 |
| Ex. 8 | S | 5 | 0.030 | 0.5 | 2.0 | 10 | 5 | 2.8 | 0.013 |
| Ex. 9 | S | 5 | 0.030 | 0.5 | 2.0 | 500 | 5 | 2.0 | 0.029 |
| Ex. 10 | S | 5 | 0.030 | 0.5 | 2.0 | 1000 | 5 | 1.7 | 0.050 |
| Com. Ex. 6 | S | 5 | 0.030 | 0.5 | 2.0 | 2000 | 5 | 1.5 | 0.325 |
| Com. Ex. 7 | S | 5 | 0.030 | 0.5 | 2.0 | 5000 | 5 | 1.4 | 0.343 |
| Ex. 11 | S | 5 | 0.030 | 0.5 | 2.0 | 100 | 1 | 4.2 | 0.135 |
| Ex. 12 | S | 5 | 0.030 | 0.5 | 2.0 | 100 | 3 | 3.8 | 0.098 |
| Ex. 13 | S | 5 | 0.030 | 0.5 | 2.0 | 100 | 7 | 2.3 | 0.030 |
| Ex. 14 | S | 5 | 0.030 | 0.5 | 2.0 | 100 | 10 | 1.7 | 0.021 |
| Ex. 15 | S | 5 | 0.030 | 0.5 | 2.0 | 100 | 20 | 1.4 | 0.016 |

In Table 1, letter S in the column of "Kind of Spring" stands for a suspension spring.

TABLE 2

|  | Kind of Spring | Configuration of Spring | | Width (mm) | Mass of Slider (mg) | Load (mg) | Thickness of Lubricant (nm) | Max Amount of Jump (nm) | Wear Thickness (nm) |
|  |  | Length (mm) | Thickness (mm) | | | | | | |
| --- | --- | --- | --- | --- | --- | --- | --- | --- | --- |
| Ex. 16 | L | 1 | 0.015 | 0.5 | 2.0 | 100 | 5 | 1.8 | 0.023 |
| Ex. 17 | L | 2 | 0.020 | 0.5 | 2.0 | 100 | 5 | 1.7 | 0.021 |
| Ex. 18 | L | 3 | 0.025 | 0.5 | 2.0 | 100 | 5 | 1.9 | 0.036 |
| Ex. 19 | L | 5 | 0.030 | 0.5 | 2.0 | 100 | 5 | 2.1 | 0.031 |
| Com. Ex. 8 | L | 7 | 0.030 | 0.5 | 2.0 | 100 | 5 | 9.5 | 0.072 |
| Com. Ex. 9 | L | 10 | 0.030 | 0.5 | 2.0 | 100 | 5 | 12.7 | 0.073 |
| Ex. 20 | S | 3 | variable 0.05~0.01 | 0.5 | 2.0 | 100 | 5 | 1.1 | 0.014 |
| Ex. 21 | L | 3 | variable 0.05~0.01 | 0.5 | 2.0 | 100 | 5 | 0.8 | 0.009 |

In Table 2, letter L in the column of "Kind of Spring" stands for a load beam spring.

Examples 1–4 and Comparative Examples 1 and 2 compare, as follows. So long as the length of the suspension spring 4 is 5 mm or below, Examples 1–4 and Comparative Examples 1 and 2 both are relatively small as to the maximum amount of jump and wear thickness. However, when the length of the spring 5 exceeds 5 mm, the maximum amount of jump and wear thickness noticeably increases in Examples 1–4 and Comparative Examples 1 and 2. It follows that if the length of the spring 4 is 5 mm or below, a contact type disk drive meeting requirements relating to seek rigidity and wear and featuring dense, reliable recording is achievable.

In Examples 1, 5 and 6 and Comparative Examples 3 and 4, both the maximum amount of jump and wear thickness are small so long as the mass of the slider 3 is 2.0 mg or above. However, when the mass of the slider 3 is smaller than 2.0 mg, the above two factors both increase. Therefore, if the slider 3 has a mass of 2.0 mg or above, the performance of the disk drive can be further enhanced.

In Examples 1 and 7–10 and Comparative Examples 6 and 7, both the maximum amount of jump and wear thickness are small so long as the load urging the slider 3 against the disk 11 is 1 g or below. However, when the load exceeds 1 g, both the maximum amount of jump and wear thickness increase. This shows that the performance of the disk drive will be further enhance if the load is selected to be 1 g or below.

In Examples 1 and 11–15, the maximum amount of jump and wear thickness both decrease with an increase in the thickness of the lubrication layer 15. Particularly, the performance is noticeably improved when the thickness of the 5 layer 15 is 5 nm or above.

In Examples 16–19 and Comparative Examples 8 and 9, both the maximum amount of jump and wear thickness are small when the load beam spring 8 has a length of 5 mm or below. However, they noticeably increase when the spring 8 is longer than 5 mm. This indicates that despite the use of the spring 8, there can be implemented a contact type disk drive meeting the requirements relating to seek rigidity and wear and featuring dense, reliable recording only if the spring 8 has a length of 5 mm or below.

Further, in Examples 20 and 12, the maximum amount of jump and wear thickness are far smaller than in any one of the other Examples. Therefore, sequentially reducing the thickness of the suspension spring or that of the load beam spring is successful to further enhance the performance.

As stated above, the mean wear thickness and maximum amount of jump available with the disk drive of the present invention are each only at least one-hundredths to one-several hundredths of those particular to a conventional disk drive of the type described. This realizes durability, i.e., reliability at least three times higher than that of the conventional disk drive in total. In addition, the disk drive of the present invention achieves four times higher line recording density than the conventional.

In summary, in accordance with the present invention, a contact type magnetic disk drive includes a suspension spring or a load beam spring whose length is smaller than 5 mm inclusive. This successfully reduces the amplitude of vibration to occur during seek. Also, a magnetic head slider has a mass of greater than 2 mg inclusive and is urged against the disk medium by a load of less than 1 g inclusive, so that a mean wear thickness and maximum amount of jump are reduced. For the reduction of the mean wear thickness and maximum amount of jump, the disk medium may include a lubrication layer having a thickness of greater than 5 nm inclusive, or the suspension spring or the load beam spring may have its thickness sequentially reduced from the side adjoining the spring support mechanism toward the slider. The disk drive therefore reduces the wear of the slider and that of a magnetic disk, and achieves durability and reliability as well as high-density recording.

Various modifications will become possible for those skilled in the art after receiving the teachings of the present disclosure without departing from the scope thereof.

What is claimed is:

1. A contact type magnetic disk drive comprising:

a contact pad carrying an electromagnetic transducer for recording and reproduction on an end thereof, and capable of sliding in contact with a magnetic disk medium;

a magnetic head slider on which said contact pad is mounted;

a gimbal spring supporting said magnetic head slider; and a load beam spring supporting said gimbal spring; and a spring support mechanism supporting said load beam spring;

wherein said load beam spring has a length smaller than 5 mm inclusive.

2. A disk drive as claimed in claim 1, wherein said magnetic head slider has a mass of greater than 2 mg inclusive and is urged against the magnetic disk medium by a load of less than 1 g inclusive.

3. A disk drive as claimed in claim 1, wherein the magnetic disk medium includes a lubrication layer having a thickness of greater than 5 nm inclusive.

4. A disk drive as claimed in claim 1, wherein said load beam spring has a thickness thereof sequentially reduced from a side adjoining said spring support mechanism toward said gimbal spring.

* * * * *